United States Patent
Tsubokura et al.

(10) Patent No.: US 7,692,732 B2
(45) Date of Patent: Apr. 6, 2010

(54) DISPLAY DEVICE WITH WATERPROOF SHEET AND WATER ABSORBING MEMBER

(75) Inventors: Masaki Tsubokura, Mobara (JP); Hiroshi Obata, Chiba (JP); Shunichi Matsumoto, Chiba (JP); Tsuyoshi Suzuki, Mobara (JP)

(73) Assignee: Hitachi Displays, Ltd. (JP)

( * ) Notice: Subject to any disclaimer, the term of this patent is extended or adjusted under 35 U.S.C. 154(b) by 165 days.

(21) Appl. No.: 11/672,600

(22) Filed: Feb. 8, 2007

(65) Prior Publication Data

US 2007/0188675 A1   Aug. 16, 2007

(30) Foreign Application Priority Data

Feb. 8, 2006  (JP)  ............... 2006-031141

(51) Int. Cl.
*G02F 1/1333*  (2006.01)
(52) U.S. Cl. .......................... 349/58; 349/60
(58) Field of Classification Search ............... 349/58, 349/59, 60
See application file for complete search history.

(56) References Cited

U.S. PATENT DOCUMENTS

| | | | |
|---|---|---|---|
| 6,247,768 B1 * | 6/2001 | Yamaguchi | 312/223.2 |
| 6,734,928 B2 * | 5/2004 | Ito et al. | 349/58 |
| 6,871,138 B1 * | 3/2005 | Minelli | 701/200 |
| 6,977,694 B2 * | 12/2005 | Natsuyama | 349/60 |
| 2001/0010569 A1 * | 8/2001 | Jin et al. | 349/58 |
| 2003/0030381 A1 * | 2/2003 | Yamazaki et al. | 315/169.1 |
| 2004/0141101 A1 * | 7/2004 | Osu et al. | 349/58 |
| 2006/0044482 A1 * | 3/2006 | Shaftel | 349/33 |
| 2006/0146486 A1 * | 7/2006 | Wikstrom et al. | 361/681 |
| 2006/0180340 A1 * | 8/2006 | Tanaka et al. | 174/250 |
| 2006/0199461 A1 * | 9/2006 | Yamazaki et al. | 445/24 |
| 2007/0070263 A1 * | 3/2007 | Nishimura et al. | 349/58 |
| 2007/0236465 A1 * | 10/2007 | Chou et al. | 345/173 |

FOREIGN PATENT DOCUMENTS

JP   2001-332074   11/2001

* cited by examiner

*Primary Examiner*—Andrew Schechter
*Assistant Examiner*—Dennis Y Kim
(74) *Attorney, Agent, or Firm*—Antonelli, Terry, Stout & Kraus, LLP.

(57) ABSTRACT

The present invention prevents the corrosion of a printed circuit board which is connected to a lower side of a display panel in a liquid crystal display panel. In a display device which includes a display panel and a frame member which supports an outer peripheral portion of a display screen of a display panel, a water absorbing member is adhered to a surface of the frame member which faces the display panel in an opposed manner.

3 Claims, 16 Drawing Sheets

DISPLAY DEVICE WITH WATERPROOF SHEET AND WATER ABSORBING MEMBER

The present application claims priority from Japanese application JP2006-031141 filed on Feb. 8, 2006, the content of which is hereby incorporated by reference into this application.

BACKGROUND OF THE INVENTION

1. Field of the Invention

The present invention relates to a display device, and more particularly to an effective technique which is applied to a large-sized liquid crystal display device such as a liquid crystal television set.

2. Description of the Related Art

Conventionally, as a liquid crystal display device, there has been a liquid crystal display for a liquid crystal television set and a PC (Personal Computer). Recently, the liquid crystal display for the liquid crystal television set or the PC is increased in size thereof.

In the liquid crystal display device such as the liquid crystal television set, for example, a component (display module) which is integrally constituted of a liquid crystal display panel, a circuit board which transmits video signals and scanning signals to the liquid crystal display panel or the like by using a frame member is housed in an exterior component (housing).

Further, a large-sized liquid crystal display device has a large amount of heat generation in use thereof, and generated heat is likely to accumulate in an upper portion of the housing (an upper portion of a display module). Accordingly, in the large-sized liquid crystal display device in recent years, a driver (drain driver) which transmits signals to a video signal line extended in the longitudinal direction of the liquid crystal display panel may be arranged on a lower side of the liquid crystal display panel.

Further, as a method to effectively radiate heat in the inside of a housing of the liquid crystal display device outside, there has been proposed a method which provides an exhaust hole at an upper portion of a housing body and provides an intake hole at a lower portion of the housing body (see JP-A-2001-332074, for example).

SUMMARY OF THE INVENTION

However, in a generally-used liquid crystal display device, a slight gap is formed between the liquid crystal display panel and the frame member as well as between the liquid crystal display panel and the housing. The schematic constitution of the liquid crystal display panel, the frame member and the housing of the conventional liquid crystal display device, the constitution is shown in FIG. 16.

The liquid crystal display panel 1 is, as shown in FIG. 16, a display panel which is formed in a state that a liquid crystal material 103 is sandwiched between a TFT substrate 101 and a counter substrate 102. Further, a lower polarizer 105 is arranged on a back surface of the TFT substrate 101, and an upper polarizer 106 is arranged on a back surface of the counter substrate 102. Further, in the case of a transmissive liquid crystal display device, an optical sheet 4 such as a light diffusion plate or a back light BL is arranged behind the liquid crystal display panel 1 as viewed from a viewer. Then, the liquid crystal display panel 1, the optical sheet 4, the back light BL are, for example, supported on the frame members such as an upper frame 5, a lower frame (not shown in the drawings), an intermediate frame (not shown in the drawings).

Here, a slight gap is formed between the liquid crystal display panel 1 (upper polarizer 106) and a cushion material 801 which is adhered on the upper frame 5 due to a clearance. Further, a slight gap is also formed between the liquid crystal display panel 1 (upper polarizer 106) and an end portion 12a of the housing 12.

In such a liquid crystal display device, for cleaning a display screen, for example, the screen is wiped using a cloth 13 containing water. Inventors of the present invention have found out that moisture contained in the cloth infiltrates the inside of a display module through the gap defined between the liquid crystal display panel 1 and the housing 12 and the gap defined between the liquid crystal display panel 1 and the upper frame 5 and, eventually, water 14 may collect on a bottom surface 5a of the upper frame 5.

The inventors of the present invention also have found out that when water 14 collects on the bottom surface 5a of the frame member (upper frame 5), water 14 corrodes a flexible printed circuit board 9, a printed circuit board 10 or a driver IC (not shown in the drawing) which is mounted on the flexible printed circuit board 9 thus giving rise to a malfunction of the liquid crystal display device.

Accordingly, it is an object of the present invention to provide a technique which can prevent the corrosion of a printed circuit board which is connected to a lower side of a display panel of a liquid crystal display device, for example.

The other objects and novel features of the present invention will become apparent from the description of this specification and attached drawings.

To briefly explain typical inventions among inventions described in this specification, they are as follows.

(1) According to the first aspect of the present invention, the present invention provides a display device which includes a display panel and a frame member which supports an outer peripheral portion of a display screen of the display panel, wherein a water absorbing member is adhered to a surface of the frame member which faces the display panel in an opposed manner.

(2) The display device having the constitution (1) is characterized in that one end of a printed circuit board which includes an insulating layer and a conductive layer is connected to at least one side of the display screen of the display panel, and the water absorbing member is adhered to a surface of the frame member which faces a side of the display screen of the display panel which is connected to the printed circuit board in an opposed manner.

(3) The display device having the constitution (1) or (2) is characterized in that the frame member includes a side surface portion which bends toward a side behind the display panel as viewed from a viewer outside a region where the frame member is overlapped to the display screen of the display panel, and the water absorbing member is adhered to the side surface portion of the frame member.

(4) The display device having any one of the constitutions (1) to (3) is characterized in that the water absorbing member is adhered to a side of the frame member which constitutes a lower side as viewed from a viewer when an image is displayed on the display screen of the display panel.

(5) The display device having any one of the constitutions (1) to (4) is characterized in that the display panel is a liquid crystal display panel.

(6) According to a second aspect of the present invention, the present invention provides a display device which includes a display panel, and a frame member which supports an outer peripheral portion of a display screen of the display panel, wherein the display screen of the display panel has a substantial polygonal shape, and a waterproof sheet which is interposed between the display panel and the frame member and, at the same time, extends along a surface of the frame member which faces the display panel in an opposed manner is adhered to at least one side of the display screen of the display panel, and a water absorbing member is arranged between the waterproof sheet and the frame member.

(7) The display device having the constitution (6) is characterized in that the water absorbing member is adhered to the frame member.

(8) The display device having the constitution (6) or (7) is characterized in that the waterproof sheet is adhered to a side of the frame member which constitutes a lower side as viewed from a viewer when an image is displayed on the display screen of the display panel.

(9) The display device having any one of the constitutions (6) to (8) is characterized in that the display panel is a liquid crystal display panel.

(10) According to a third aspect of the present invention, the present invention provides a display device which includes a display panel, and a frame member which supports an outer peripheral portion of a display screen of the display panel, wherein the display screen of the display panel has a substantial polygonal shape, and a waterproof sheet which is interposed between the display panel and the frame member and, at the same time, extends along a surface of the frame member which faces the display panel in an opposed manner is adhered to at least one side of the display screen of the display panel.

(11) The display device having the constitution (10) is characterized in that one end of a printed circuit board which includes an insulating layer and a conductive layer is connected to at least one side of the display screen of the display panel, and the waterproof sheet is adhered to a side of the display screen of the display panel which is connected to the printed circuit board in an opposed manner.

(12) The display device having the constitution (11) is characterized in that the waterproof sheet is bent toward a side behind the display panel as viewed from a viewer, and the waterproof sheet extends between the printed circuit board and the frame member.

(13) The display device having anyone of the constitutions (10) to (12) is characterized in that the waterproof sheet is adhered to a side of the frame member which constitutes a lower side as viewed from a viewer when an image is displayed on the display screen of the display panel.

(14) The display device having anyone of the constitutions (10) to (13) is characterized in that the frame member includes a side surface portion which bends toward a side behind the display panel as viewed from a viewer outside a region where the frame member is overlapped to the display screen of the display panel, and forms a through hole in the side surface portion along which the waterproof sheet extends.

(15) The display device having anyone of the constitutions (10) to (13) is characterized in that the frame member includes a side surface portion which bends toward a side behind the display panel as viewed from a viewer outside a region where the frame member is overlapped to the display screen of the display panel, and includes a recessed portion on a surface of the side surface portion which faces the display panel along which the waterproof sheet extends in an opposed manner.

(16) The display device having anyone of the constitutions (10) to (15) is characterized in that the display panel is a liquid crystal display panel.

In the display device according to the present invention having the frame member which supports an outer peripheral portion of the display screen of the display panel, the water absorbing member is adhered to the surface of the frame member which faces the display panel in an opposed manner. The water absorbing member may be formed of any member which has the high absorbance such as non-woven fabric, sponge, a foamed material or a water absorbing gel. Due to such a constitution, in wiping the display screen of the display panel using a cloth containing water or the like, for example, even when moisture contained in the cloth or the like attempts to infiltrate the inside of the frame member through a gap defined between the display panel and the frame member, the moisture is absorbed by the water absorbing member. Accordingly, it is possible to prevent the corrosion of a printed circuit board attributed to the moisture which infiltrates the inside of the frame member.

Here, it is preferable to make the water absorbing member adhere to the side of the display panel to which the flexible printed circuit board or the printed circuit board is connected out of the sides of the display panel. Here, the printed circuit board may be arranged parallel to the display screen of the display panel or may be arranged to be bent toward a side behind the display panel as viewed from the viewer. In any cases, by arranging the water absorbing member in a state that the water absorbing member extends between the printed circuit board and the frame member, it is possible to prevent the corrosion of the printed circuit board attributed to the moisture which infiltrates the inside of the frame member.

Further, for example, when the moisture contained in the cloth or the like infiltrates the inside of the frame member through the gap defined between the display panel and the frame member, due to the influence of gravity, the moisture infiltrates from the lower side of the display panel. Accordingly, it is desirable to make the water absorbing member adhere to the surface of the frame member which faces the side of the display panel in an opposed manner which constitutes the lower side as viewed from the viewer when an image is displayed on the display screen of the display panel.

Further, according to the display device of the present invention, for example, the waterproof sheet which is interposed between the display panel and the frame member and extends along the surface of the frame member which faces the display panel in an opposed manner may be adhered to at least one side of the display panel, and the water absorbing member may be arranged between the waterproof sheet and the frame member. By combining both of the waterproof sheet and the water absorbing member in this manner, it is possible to further enhance the advantageous effect to prevent the corrosion of the printed circuit board attributed to the moisture which infiltrates the inside of the frame member.

Further, according to the display device of the present invention, it may be possible to adopt only the constitution in which the waterproof sheet which is interposed between the display panel and the frame member and extends along the surface of the frame member which faces the display panel in an opposed manner may be adhered to at least one side of the display panel. Due to such a constitution, for example, in wiping the display screen of the display panel using a cloth containing water or the like, even when moisture contained in the cloth or the like attempts to infiltrate the inside of the frame member through a gap defined between the display panel and the frame member, the moisture collects between the waterproof sheet and the frame member. Accordingly, it is possible to prevent the corrosion of a printed circuit board attributed to the moisture which infiltrates the inside of the frame member.

Here, it is preferable to make the waterproof sheet adhere to the side of the display panel to which the flexible printed circuit board or the printed circuit board is connected out of the sides of the display panel. Here, the printed circuit board may be arranged parallel to the display screen of the display panel or may be arranged to be bent toward a side behind the display panel as viewed from the viewer. In any cases, by arranging the waterproof sheet in a state that the waterproof sheet extends between the printed circuit board and the frame member, it is possible to prevent the corrosion of the printed circuit board attributed to the moisture which infiltrates the inside of the frame member.

Further, for example, when the moisture contained in the cloth or the like infiltrates the inside of the frame member through the gap defined between the display panel and the frame member, due to the influence of gravity, the moisture infiltrates from the lower side of the display panel. Accordingly, it is desirable to make the waterproof sheet adhere to the side of the display panel which constitutes the lower side as viewed from the viewer when an image is displayed on the display screen of the display panel.

Further, the frame member has the side portion which is bent toward the side behind the display panel as viewed from the viewer outside the region where the frame member is overlapped to the display screen of the display panel, in general. Further, the moisture which infiltrates the inside of the frame member collects on the side portion (a bottom portion) which is positioned below the display panel out of the side portions. Accordingly, by forming the through hole in the bottom portion of the frame member, water which infiltrates the inside of the frame member and collects on the bottom portion can be drained to the outside of the frame member by way of the through hole and hence, it is possible to increase an advantageous effect to prevent the corrosion of the printed circuit board.

Here, in place of forming the though hole, a recessed portion may be formed in a surface of the side portion along which the waterproof sheet extends and which faces the display panel in an opposed manner thus allowing the infiltrated water to collect in the recessed portion.

Here, the display device of the present invention may be any device provided that the display panel is a panel which displays images or videos using electric signals and includes a printed circuit board for inputting electric signals such as video signals or scanning signals to the display panel. However, it is particularly desirable to use the display panel as a liquid crystal display panel of the display device.

DESCRIPTION OF THE PREFERRED EMBODIMENTS

Hereinafter, the present invention is explained in detail in conjunction with modes for carrying out the invention (embodiments) by reference to drawings.

Here, in all drawings for explaining the embodiments, parts having identical functions are given same symbols and their repeated explanation is omitted.

Embodiment 1

Figure 1:
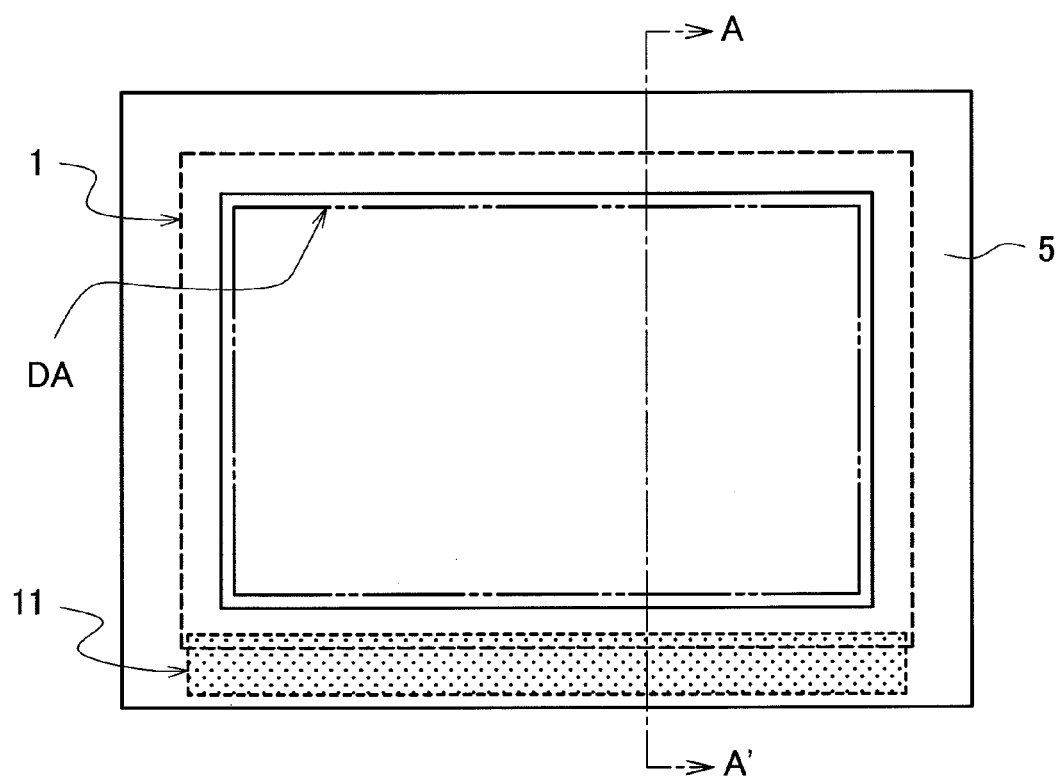
FIG. 1 is a plan view showing the schematic constitution of a liquid crystal display module which is housed in a liquid crystal display device of an embodiment 1.
Figure 2:
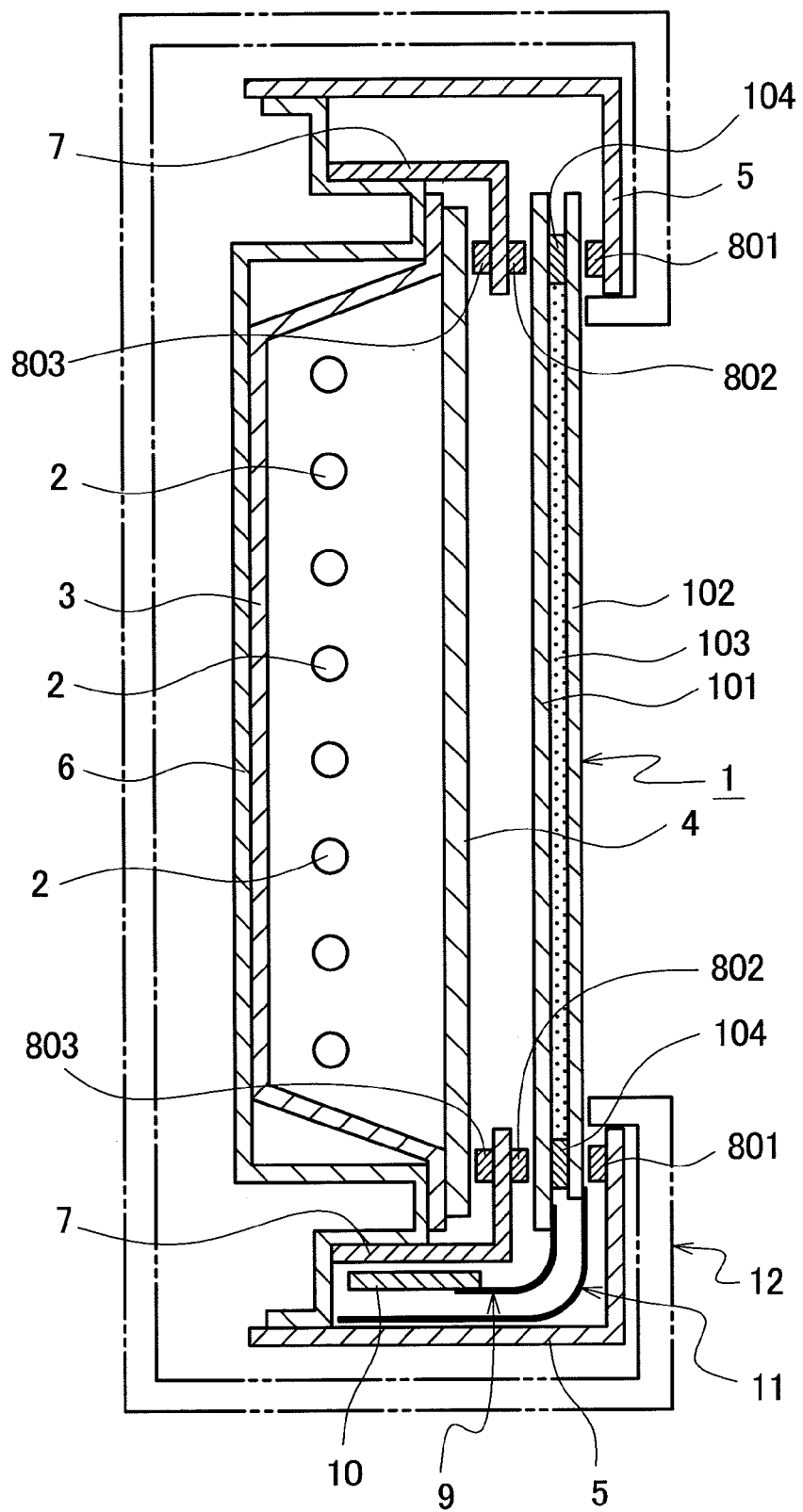
FIG. 2 is a cross-sectional view taken along a line A-A' in FIG. 1.

FIG. 1 and FIG. 2 are schematic views showing the schematic constitution of a liquid crystal display device of the embodiment 1 according to the present invention. FIG. 1 is a plan view showing the schematic constitution of a liquid crystal display module housed in the liquid crystal display device of the embodiment 1. FIG. 2 is a cross-sectional view taken along a line A-A' in FIG. 1.

The liquid crystal display device of the embodiment 1 is a transmissive liquid crystal display device. As shown in FIG. 1 and FIG. 2, for example, light sources (fluorescent tubes) 2 and a reflector 3 are arranged behind a liquid crystal display panel 1. The liquid crystal display panel 1 is, as shown in FIG. 2, a display panel which sandwiches a liquid crystal material 103 between a TFT substrate 101 and a counter substrate 102. Here, the TFT substrate 101 and the counter substrate 102 are adhered to each other using an annular sealing material 104. The liquid crystal material 103 is sealed into a space surrounded by the TFT substrate 101, the counter substrate 102 and the sealing material 104.

Further, between the liquid crystal display panel 1 and the light sources 2, for example, an optical sheet 4 such as a light diffusion plate is arranged. Here, the liquid crystal display panel 1, the light sources 2, the reflector 3 and the optical sheet 4 are, for example, integrally supported on a frame member which is constituted of an upper frame 5, a lower frame 6 and an intermediate frame 7.

Here, the liquid crystal display panel 1 is supported in a state that the upper frame 5 and the intermediate frame 7 sandwich an outer peripheral portion of the liquid crystal display panel 1 therebetween. Further, a cushion material 801 is adhered to a portion of the upper frame 5 which supports the liquid crystal display panel 1, while a cushion material 802 is adhered to a portion of the intermediate frame 7 which supports the liquid crystal display panel 1.

Although not shown in the drawing, the light sources 2 are, for example, supported on a support member (a pin mold) which is arranged on a surface of the reflector 3 which faces the liquid crystal display panel 1 in an opposed manner. Further, the reflector 3 and the optical sheet 4 are supported in a state that the reflector 3 and the optical sheet 4 are sandwiched between the lower frame 6 and the intermediate frame 7. Here, a cushion material 803 is adhered to a portion of the intermediate frame 7 which supports the optical sheet 4.

Further, in the liquid crystal display panel 1, for example, a plurality of video signal lines (not shown in the drawing) which extends in the longitudinal direction of a display region DA is arranged in the lateral direction of the display region DA, while a plurality of scanning signal lines (not shown in the drawing) which extends in the lateral direction of the display region DA is arranged in the longitudinal direction of the display region DA. Here, a region surrounded by two adjacent video signal lines and two adjacent scanning signal lines forms one pixel region. Here, the each brightness (gray scales) of the respective pixel regions are controlled in response to video signals which are inputted to the video signal lines and scanning signals which are inputted to the scanning signal lines. For this end, for example, a flexible printed circuit board 9 for inputting video signals to the video signal lines has one end thereof connected to the lower side of the TFT substrate 101 of the liquid crystal display panel 1. Further, the flexible printed circuit board 9 has the other end thereof connected to a printed circuit board 10. Here, although not shown in FIG. 2, a driver IC (a drain driver), for example, may be mounted on the flexible printed circuit board 9.

Although not shown in the drawing, a flexible printed circuit board and a printed circuit board for inputting the scanning signal lines are connected to left and right sides of the TFT substrate 101 of the liquid crystal display panel besides the flexible printed circuit board 9 and the printed circuit board 10 for inputting the video signals. Also, a driver IC (a gate driver), for example, may be mounted on the flexible printed circuit board for inputting the scanning signal lines.

Further, although not shown in the drawing, a printed circuit board or the like which controls output timing of the video signals and the scanning signals is arranged behind the lower frame 6 (the back surface), for example. The printed circuit board is, for example, connected to the printed circuit board 10 or the like using a flexible substrate.

Further, in the liquid crystal display device of the embodiment 1, a waterproof sheet 11 is adhered to a lower side of the counter substrate 102 of the liquid crystal display panel 1. The waterproof sheet 11 extends along an inner surface of the upper frame 5 and, at the same time, the waterproof sheet 11 is arranged to extend between the flexible printed circuit board 9, the printed circuit board 10 and the upper frame 5.

Further, as shown in FIG. 1 and FIG. 2, the structure in which the liquid crystal display panel 1, the light source 2, the reflector 3, the optical sheet 4, the flexible printed circuit board 9 and the printed circuit board 10 are integrally supported on the upper frame 5, the lower frame 6 and the intermediate frame 7 is referred to as a liquid crystal display module. In the liquid crystal display device such as a liquid crystal television receiver set, the liquid crystal display module having such structure is housed in a resin-made housing 12, for example.

Figure 3:
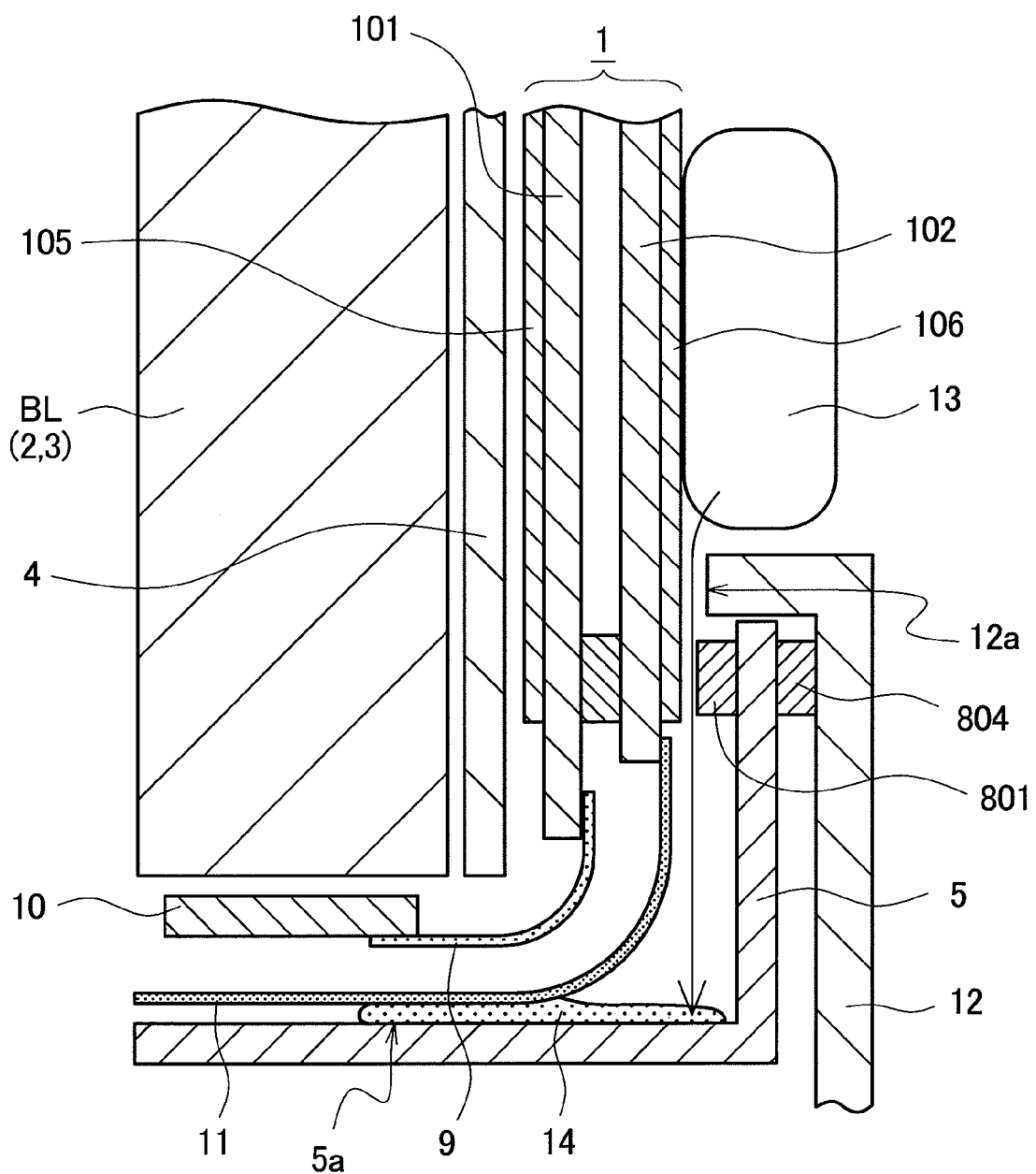
FIG. 3 is a schematic cross-sectional view for explaining the manner of operation and advantageous effects of the liquid crystal display device of the embodiment 1.

FIG. 3 is a schematic cross-sectional view for explaining the manner of operation and advantageous effects of the liquid crystal display device of the embodiment 1. Here, FIG. 3 is a schematic cross-sectional view showing a lower part of the cross-sectional view shown in FIG. 2 in an enlarged manner.

With respect to the liquid crystal display device of the embodiment 1, the liquid crystal display panel 1 is configured such that, in practice, for example, as shown in FIG. 3, a lower polarizer 105 is arranged on a back surface of the TFT substrate 101, while an upper polarizer 106 is arranged on a back surface of the counter substrate 102. Here, a retardation plate may be arranged between the TFT substrate 101 and the lower polarizer 105 as well as between the counter substrate 102 and the upper polarizer 106. Further, thicknesses of the TFT substrate 101 and the counter substrate 102 become irregular respectively from product to product. Further, a thickness of the liquid crystal material 103 becomes irregular from product to product. Accordingly, there exists a clearance in a portion of the upper frame 5 which supports the liquid crystal display panel 1. For example, a slight gap is formed between the upper polarizer 106 of the liquid crystal display panel 1 and the cushion material 801. In the same manner, a slight gap is formed between an end portion 12a of the housing 12 which houses the liquid crystal display module and the upper polarizer 106 of the liquid crystal display panel 1.

Accordingly, there may be a case that, in cleaning a display screen, for example, when the display screen is wiped using a cloth 13 containing water and the like, moisture contained in the cloth infiltrates the inside of the display module through the gap defined between the upper polarizer 106 (the liquid crystal display panel 1) and the end portion 12a of the housing and the gap defined between the upper polarizer 106 and the cushion material 801 (the upper frame 5), and water 14 collects on the bottom surface 5a of the upper frame 5.

Further, there has been a drawback that when water 14 collects on a bottom surface 5a of the frame member (the upper frame 5) in this manner, water 14 corrodes the flexible printed circuit board 9, the printed circuit board 10, the driver IC (not shown in the drawing) which is mounted on the flexible printed circuit board 9 and the like thus giving rise to a malfunction of the liquid crystal display device.

Accordingly, in the embodiment 1, by adhering the waterproof sheet 11 to the counter substrate 102 of the liquid crystal display panel 1 and by extending a waterproof sheet 11 between the flexible printed circuit board 9, the printed circuit board 10 and the bottom surface 5a of the upper frame 5, the waterproof sheet 11 constitutes a wall and hence, it is possible to prevent water 14 which collects on the bottom surface 5a of the upper frame 5 from being adhered to the flexible printed circuit board 9 and the printed circuit board 10, for example. Accordingly, it is possible to prevent the corrosion of the flexible printed circuit board 9 and the printed circuit board 10 attributed to the water 14 which infiltrates through the gap defined between the liquid crystal display panel 1 and the upper frame 5.

Figure 4:
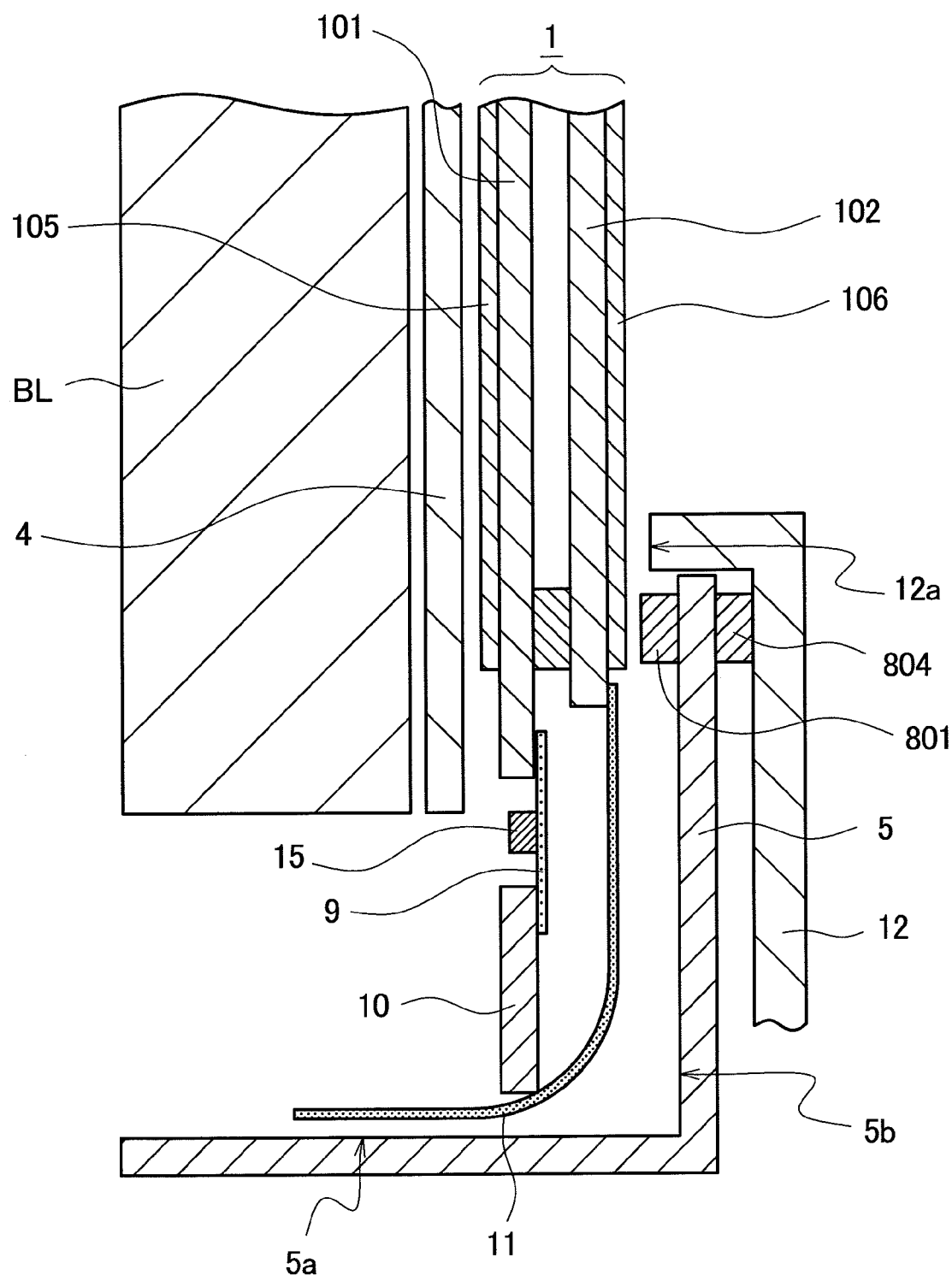
FIG. 4 is a schematic cross-sectional view showing a first modification of the liquid crystal display device of the embodiment 1.

FIG. 4 is a schematic cross-sectional view showing a first modification of the liquid crystal display device of the embodiment 1.

In the example shown in FIG. 2, and FIG. 3, the flexible printed circuit board 9 is curved rearwardly as viewed from a viewer, that is, to the backlight BL side which is constituted of the light sources 2 and the reflector 3 and the printed circuit board 10 is arranged on the side surface of the backlight BL. However, depending on a type of a liquid crystal display device, for example, as shown in FIG. 4, there may be a case that the flexible printed circuit board 9 and the printed circuit board 10 are arranged in parallel to the display surface of the liquid crystal display panel 1. Also in this case, as shown in FIG. 4, by extending a waterproof sheet 11 between the flexible printed circuit board 9, the printed circuit board 10 and the upper frame 5, the waterproof sheet 11 forms a wall and hence, it is possible to prevent water which infiltrates the inside of the display module through a gap defined between the upper polarizer 106 (the liquid crystal display panel 1) and the end portion 12a of the housing and a gap defined between the upper polarizer 106 and the cushion material 801 (the upper frame 5) from being adhered to the flexible printed circuit board 9, the printed circuit board 10 and a driver IC 15. Accordingly, it is possible to prevent the corrosion of the flexible printed circuit board 9, the printed circuit board 10 and the driver IC 15 attributed to water which infiltrates through the gap defined between the liquid crystal display panel 1 and the upper frame 5.

Figure 5:
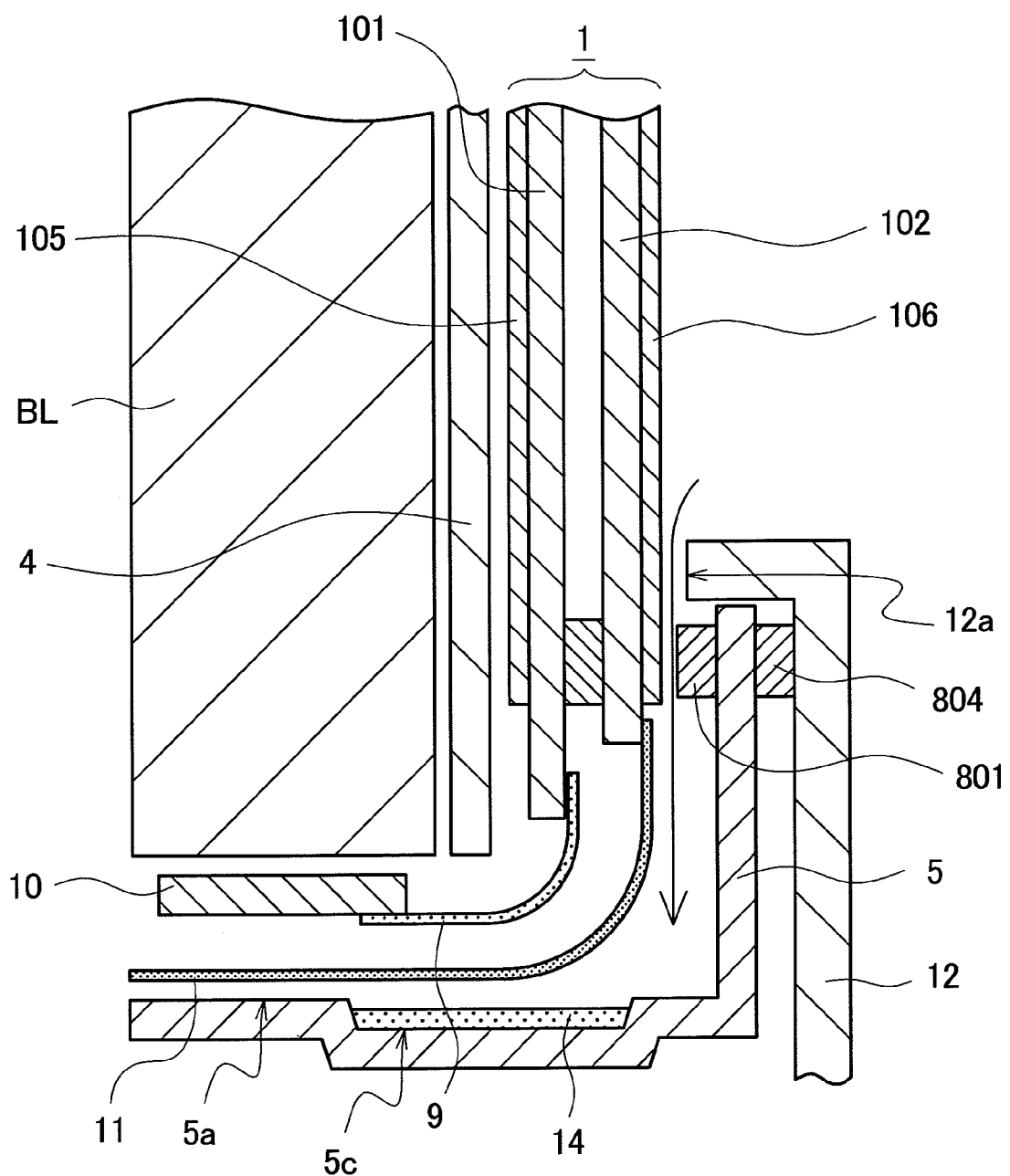
FIG. 5 is a schematic cross-sectional view showing a second modification of the liquid crystal display device of the embodiment 1.

FIG. 5 is a schematic cross-sectional view showing a second modification of the liquid crystal display device of the embodiment 1.

In the example shown in FIG. 2 and FIG. 3 and in the example shown in FIG. 4, a bottom surface 5a of the upper frame 5 on which water 14 collects is formed in a flat shape. Accordingly, for example, there is a possibility that the collected water 14 moves on the bottom surface 5a of the upper frame 5 due to vibration or the like and infiltrates the flexible printed circuit board 9 side and the printed circuit board 10 side from the end portion of the waterproof sheet 11. Accordingly, on the bottom surface 5a of the upper frame 5, for example, as shown in FIG. 5, it is preferable to provide a recessed portion (a groove) 5c for collecting water 14. By adopting such a constitution, the infiltrated water 14 collects in the recessed portion 5c and hence, it is possible to prevent the movement of water 14 on the bottom surface 5a of the upper frame 5 due to vibration or the like. In this manner, a corrosion prevention effect of the flexible printed circuit board 9 and the printed circuit board 10 can be enhanced.

Figure 6:
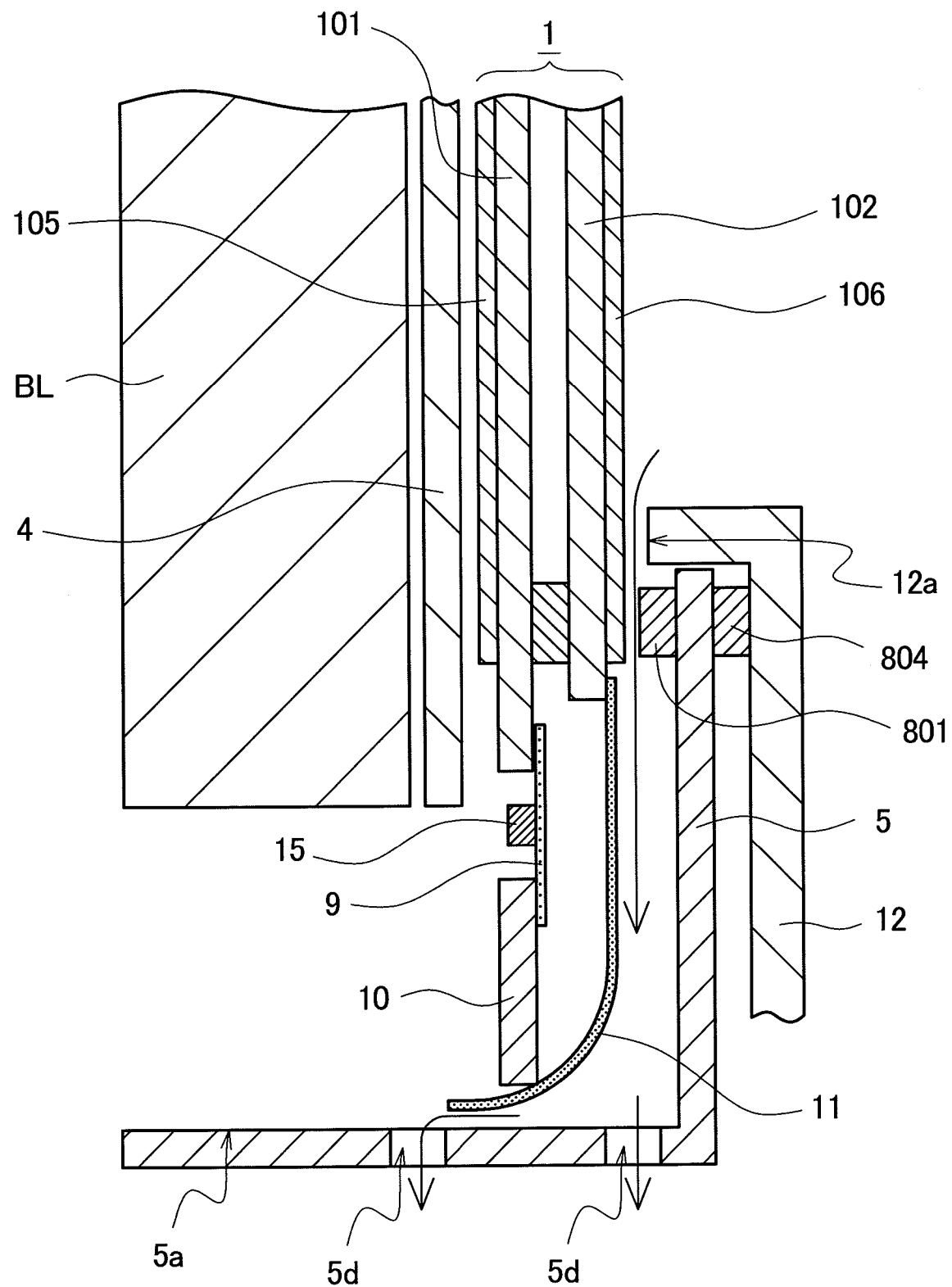
FIG. 6 is a schematic cross-sectional view showing a third modification of the liquid crystal display device of the embodiment 1.

FIG. 6 is a schematic cross-sectional view showing a third modification of the liquid crystal display device of the embodiment 1.

In the example shown in FIG. 2 and FIG. 3, in the example shown in FIG. 4, and in the example shown in FIG. 5, for example, water 14 which collects on the bottom surface 5a of the upper frame 5 is prevented from being adhered to the flexible printed circuit board 9 and the printed circuit board 10 by the waterproof sheet 11. However, when water 14 collects on the bottom surface 5a of the upper frame 5, provided that water 14 is left as it is, water 14 moves to the flexible printed circuit board 9 side, the printed circuit board 10 side and the driver IC 15 side through a gap defined between the waterproof sheet 11 and the upper frame 5 when water 14 is vaporized (evaporated), thus arising a possibility that water 14 corrodes the flexible printed circuit board 9 and the printed circuit board 10. Accordingly, it is preferable to form through holes 5d in the bottom surface 5a of the upper frame 5, for example, as shown in FIG. 6. By adopting such a constitution, water which infiltrates the inside of the display module through the gap defined between the upper polarizer 106 (the liquid crystal display panel 1) and the end portion 12a of the housing, and the gap defined between the upper polarizer 106 and the cushion material 801 (the upper frame 5) can be drained through the through holes 5d and hence, it is possible to prevent water 14 from collecting on the bottom surface 5a of the upper frame 5. In this manner, a corrosion prevention effect of the flexible printed circuit board 9, the printed circuit board 10 and the driver IC 15 can be enhanced.

Figure 7:
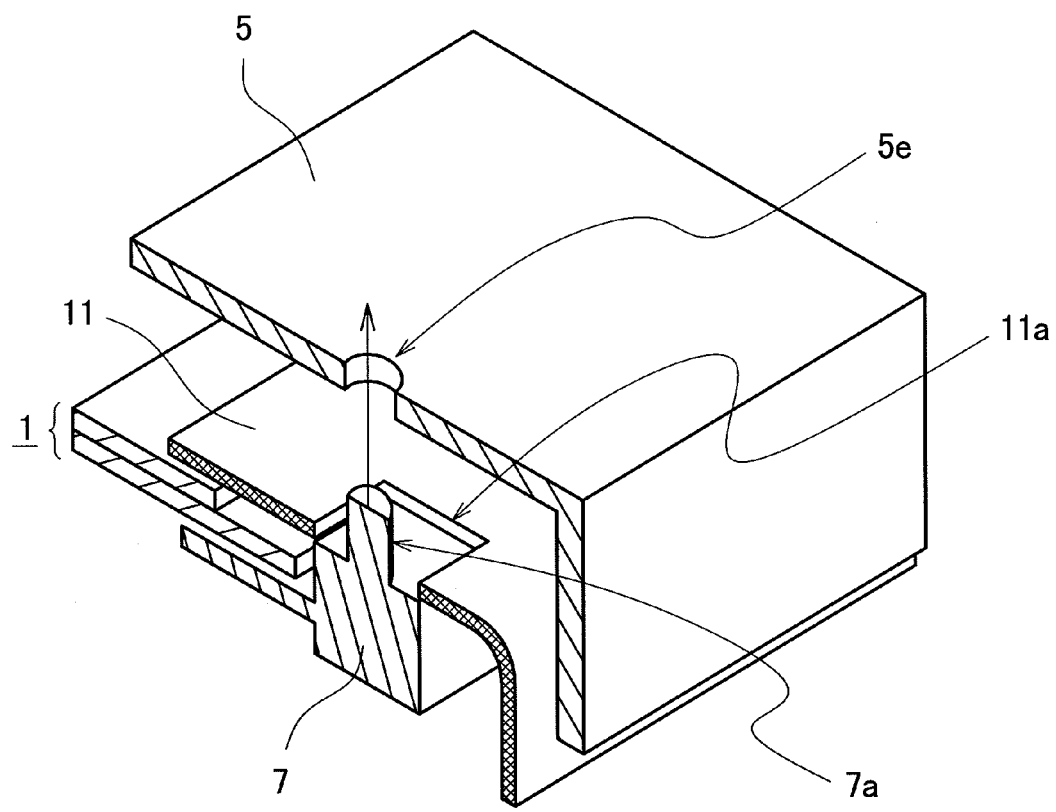
FIG. 7 is a schematic cross-sectional view showing a fourth modification of the liquid crystal display device of the embodiment 1.

FIG. 7 is a schematic cross-sectional view showing a fourth modification of the liquid crystal display device of the embodiment 1.

In assembling the liquid crystal display device of the embodiment 1, for example, as shown in FIG. 7, the liquid crystal display panel 1 is placed on the intermediate frame 7 and, thereafter, the upper frame 5 covers the liquid crystal display panel 1 and, for example, the upper frame 5 and the intermediate frame 7 are fixed to each other using bolts. Here, to enhance the operability of the assembly, for example, a positioning pin 7a is mounted on the intermediate frame 7 and a positioning hole 5e is mounted on the upper frame 5 in many cases. In such a case, as shown in FIG. 7, an opening portion 11a may be formed in a portion of the waterproof sheet 11 which is overlapped to the positioning pin 7a.

Here, in the embodiment 1, the case in which the waterproof sheet 11 is adhered to the lower side of the liquid crystal display panel 1 is exemplified. However, the present invention is not limited to such an example, and the waterproof sheet 11 may be adhered to the upper side of the liquid crystal display panel 1 or to the left or right side of the liquid crystal display panel 1. Further, in the embodiment 1, the case in which the flexible printed circuit board 9 and the printed circuit board 10 for inputting the video signal line are connected to the lower side of the liquid crystal display panel 1 is exemplified. However, the present invention is not limited to such an example, and the flexible printed circuit board 9 and the printed circuit board 10 may be connected to the upper side of the liquid crystal display panel 1. Further, the flexible printed circuit board 9 and the printed circuit board 10 may be connected to both of the upper side and the lower side of the liquid crystal display panel 1.

Further, in the embodiment 1, the waterproof sheet 11 is adhered to the surface of the counter substrate 102 of the liquid crystal display panel 1 to which the upper polarizer 106 is adhered. However, the present invention is not limited to such an example, and the waterproof sheet 11 may be adhered to the upper polarizer 106. Further, the waterproof sheet 11 may be adhered to a surface of the TFT substrate 101 which faces the counter substrate 102 in an opposed manner in the state that the waterproof sheet 11 covers the flexible printed circuit board 9.

Further, in the embodiment 1, the transmissive liquid crystal display device is exemplified. However, it is needless to say that the present invention is not limited to such an example, and the liquid crystal display device may be a semi-transmissive liquid crystal display device or a reflective liquid crystal display device. Further, in cases of the transmissive liquid crystal display device or the semi-transmissive liquid crystal display device, the constitution of the backlight BL is not limited to the combination of the fluorescent tube 2 and the reflector 3 and, for example, a combination of the fluorescent tube 2 and the light guide plate or a combination which applies a spotlight source such as LED (Light Emitting Diode) in place of the fluorescent tube 2 may be also available.

Still further, in the embodiment 1, the liquid crystal display device is exemplified. However, the present invention is not limited to the liquid crystal display device, and it is needless to say that the present invention is applicable to, for example, a display device which uses a PDP (Plasma Display Panel) or a display device which uses an organic EL (Electro Luminescence) panel.

Embodiment 2

Figure 8:
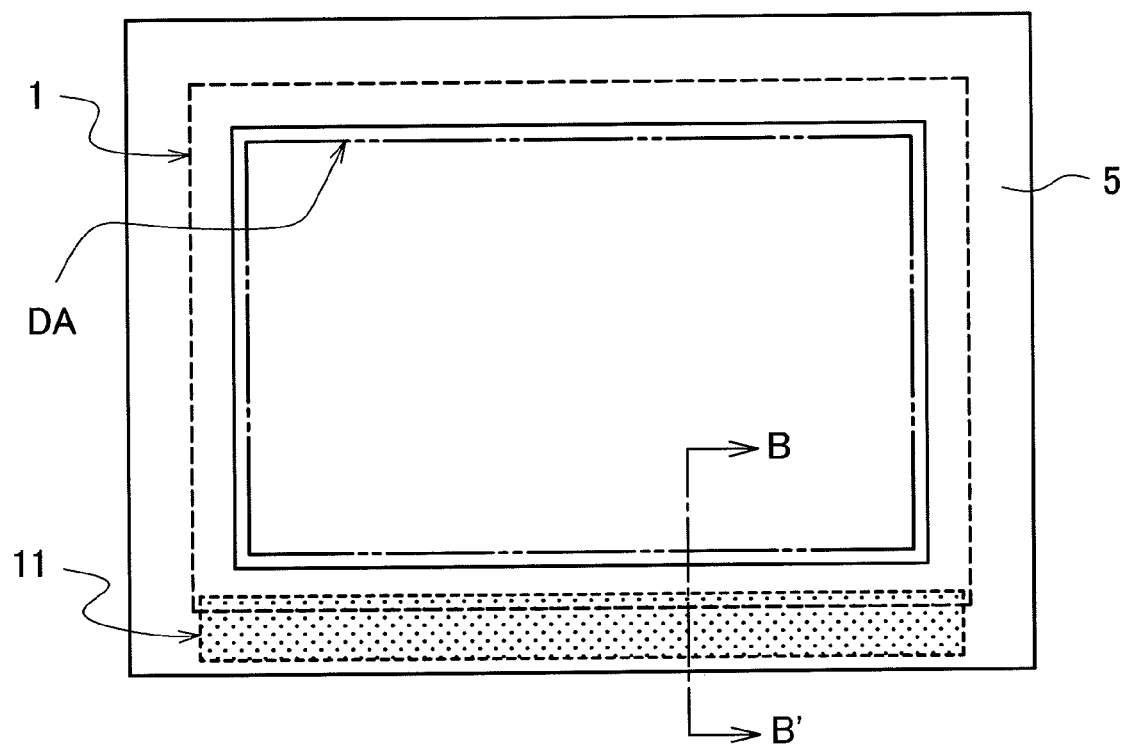
FIG. 8 is a plan view showing the schematic constitution of a liquid crystal display module which is housed in a liquid crystal display device of an embodiment 2.
Figure 9:
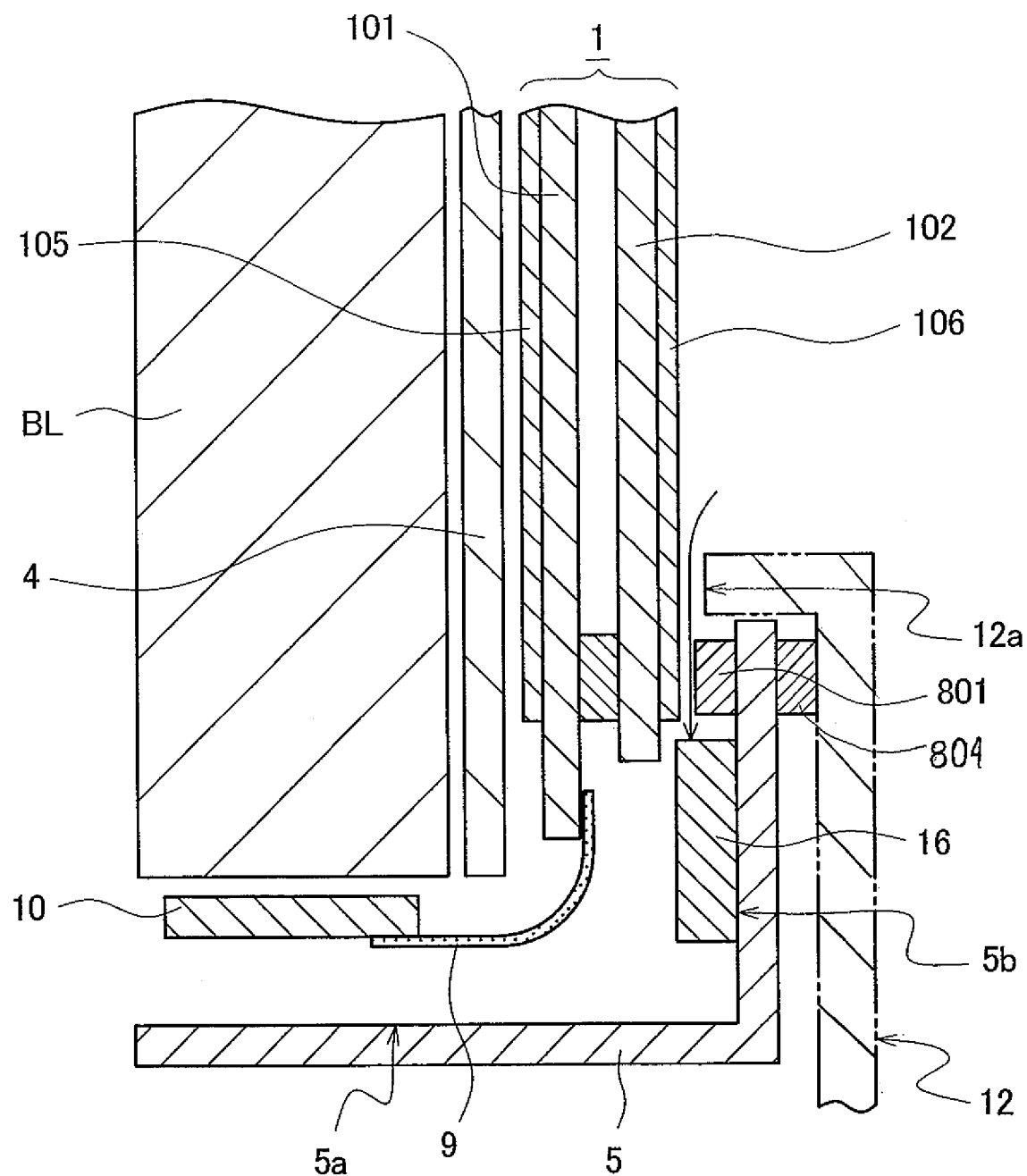
FIG. 9 is a schematic cross-sectional view taken along a line B-B' in FIG. 8.

FIG. 8 and FIG. 9 are schematic views showing the schematic constitution of a liquid crystal display device of the embodiment 2 according to the present invention. FIG. 8 is a plan view showing the schematic constitution of a liquid crystal display module housed in the liquid crystal display device of the embodiment 2. FIG. 9 is a cross-sectional view taken along a line B-B' in FIG. 8. Here, FIG. 9 is a schematic cross-sectional view which omits the constitution which is not directly related to the present invention.

The liquid crystal display device of the embodiment 2 is a transmissive liquid crystal display device. As shown in FIG. 8 and FIG. 9, for example, a backlight BL is arranged behind a liquid crystal display panel 1, and an optical sheet 4 is arranged between the liquid crystal display panel 1 and the backlight BL. The liquid crystal display panel 1 is, as shown in FIG. 9, a display panel which sandwiches a liquid crystal material 103 between a TFT substrate 101 and a counter substrate 102. Further, in the liquid crystal display device 1, for example, as shown in FIG. 9, a lower polarizer 105 is arranged on a back surface of the TFT substrate 101 and an upper polarizer 106 is arranged on a back surface of the counter substrate 102. Here, retardation plates may be arranged between the TFT substrate 101 and the lower polarizer 105 as well as between the counter substrate 102 and the upper polarizer 106.

Further, the backlight BL may be, as mentioned in the embodiment 1, constituted of a combination of a fluorescent tube 2 and a reflector 3 or a combination of the fluorescent tube 2 and a light guide plate. Still further, the backlight BL may be constituted of a combination which uses spot light sources such as LEDs in place of the fluorescent tube 2.

Further, in the liquid crystal display panel 1, for example, a plurality of video signal lines (not shown in the drawing) which extends in the longitudinal direction of a display region DA is arranged in the lateral direction of the display region DA, while a plurality of scanning signal lines (not shown in the drawing) which extends in the lateral direction of the display region DA is arranged in the longitudinal direction of the display region DA. Here, a region surrounded by two adjacent video signal lines and two adjacent scanning signal lines forms one pixel region. Here, the each brightness (gray scales) of the respective pixel regions are controlled in response to video signals which are inputted to the video signal lines and scanning signals which are inputted to the scanning signal lines. For this end, for example, a flexible printed circuit board 9 for inputting video signals to the video signal lines has one end thereof connected to the lower side of the TFT substrate 101 of the liquid crystal display panel 1. Further, the flexible printed circuit board 9 has the other end thereof connected to a printed circuit board 10. Here, although not shown in FIG. 2, a driver IC (a drain driver), for example, may be mounted on the flexible printed circuit board 9.

Although not shown in the drawing, a flexible printed circuit board and a printed circuit board for inputting the scanning signal lines are connected to left and right sides of the TFT substrate 101 of the liquid crystal display panel 1 besides the flexible printed circuit board 9 and the printed circuit board 10 for inputting the video signals. Also, a driver IC (a gate driver), for example, may be mounted on the flexible printed circuit board for inputting the scanning signal lines.

Also in the liquid crystal display device of the embodiment 2, the liquid crystal display panel 1, the backlight BL, and the optical sheet 4 are integrally supported on a frame member which is constituted of an upper frame 5, a lower frame (not shown in the drawing), and an intermediate frame (not shown in the drawing), for example.

Here, the liquid crystal display panel 1 is supported in a state that the upper frame 5 and the intermediate frame (not shown in the drawing) sandwich an outer peripheral portion of the liquid crystal display panel 1 therebetween. Further, a cushion material 801 is adhered to a portion of the upper frame 5 which supports the liquid crystal display panel 1. However, a slight gap is formed between the upper polarizer 106 (liquid crystal display panel 1) and the cushion material 801 (upper frame 5) by a clearance. In the same manner, a slight gap is also formed between an end portion 12a of a housing 12 which houses the liquid crystal display module and the upper polarizer 106 of the liquid crystal display panel 1.

Accordingly, in cleaning the display screen, for example, when the screen is wiped using a cloth containing water, there is the possibility that the moisture contained in the cloth infiltrates the inside of the display module through the gap defined between the upper polarizer 106 (liquid crystal display panel 1) and the end portion 12a of the housing 12 and through the gap defined between the upper polarizer 106 and the cushion material 801 (upper frame 5).

Here, in the liquid crystal display device of the embodiment 2, as shown in FIG. 9, a member having a high absorbance (water absorbing member) 16 is adhered to the upper frame 5. As the water absorbing member 16, for example, a non-woven fabric, a sponge, a foamed material, water absorbing gel or the like can be used. Further, the water absorbing member 16 is adhered to the upper frame 5 using a tacky material or an adhesive material having a high waterproof.

Due to such a constitution, the water which infiltrates the inside of the display module through the gap defined between the upper polarizer 106 (liquid crystal display panel 1) and the end portion 12a of the housing 12 and through the gap defined between the upper polarizer 106 and the cushion material 801 (upper frame 5) can be absorbed by the water absorbing member 16. Accordingly, it is possible to prevent the water which infiltrates the inside of the display module from collecting on a bottom surface 5a of the upper frame 5 or from being adhered to the flexible printed circuit board 9 or the printed circuit board 10 and hence, it is possible to prevent the corrosion of the flexible printed circuit board 9 and the printed circuit board 10.

Figure 10:
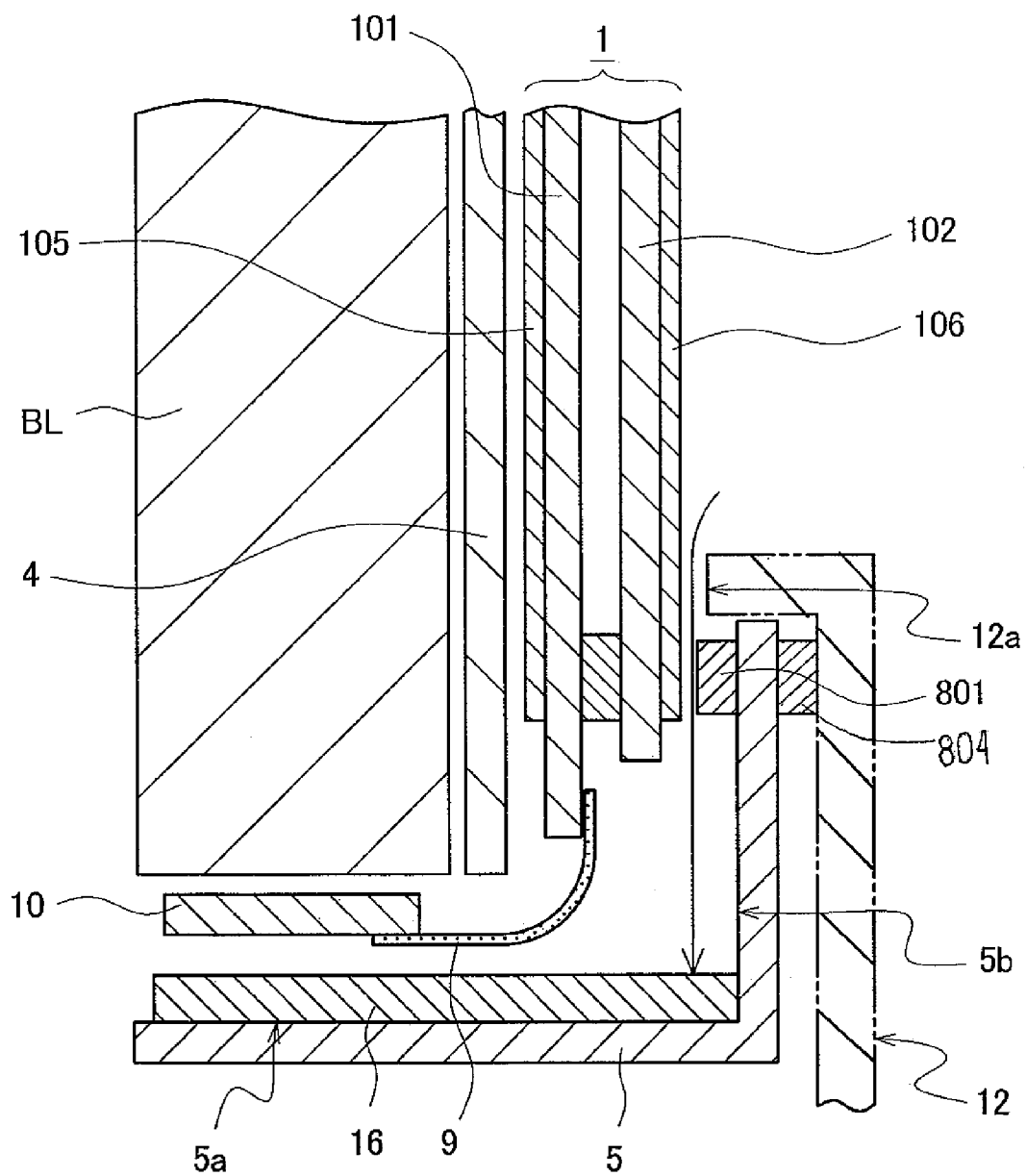
FIG. 10 is a schematic cross-sectional view showing a first modification of the liquid crystal display device of the embodiment 2.
Figure 11:
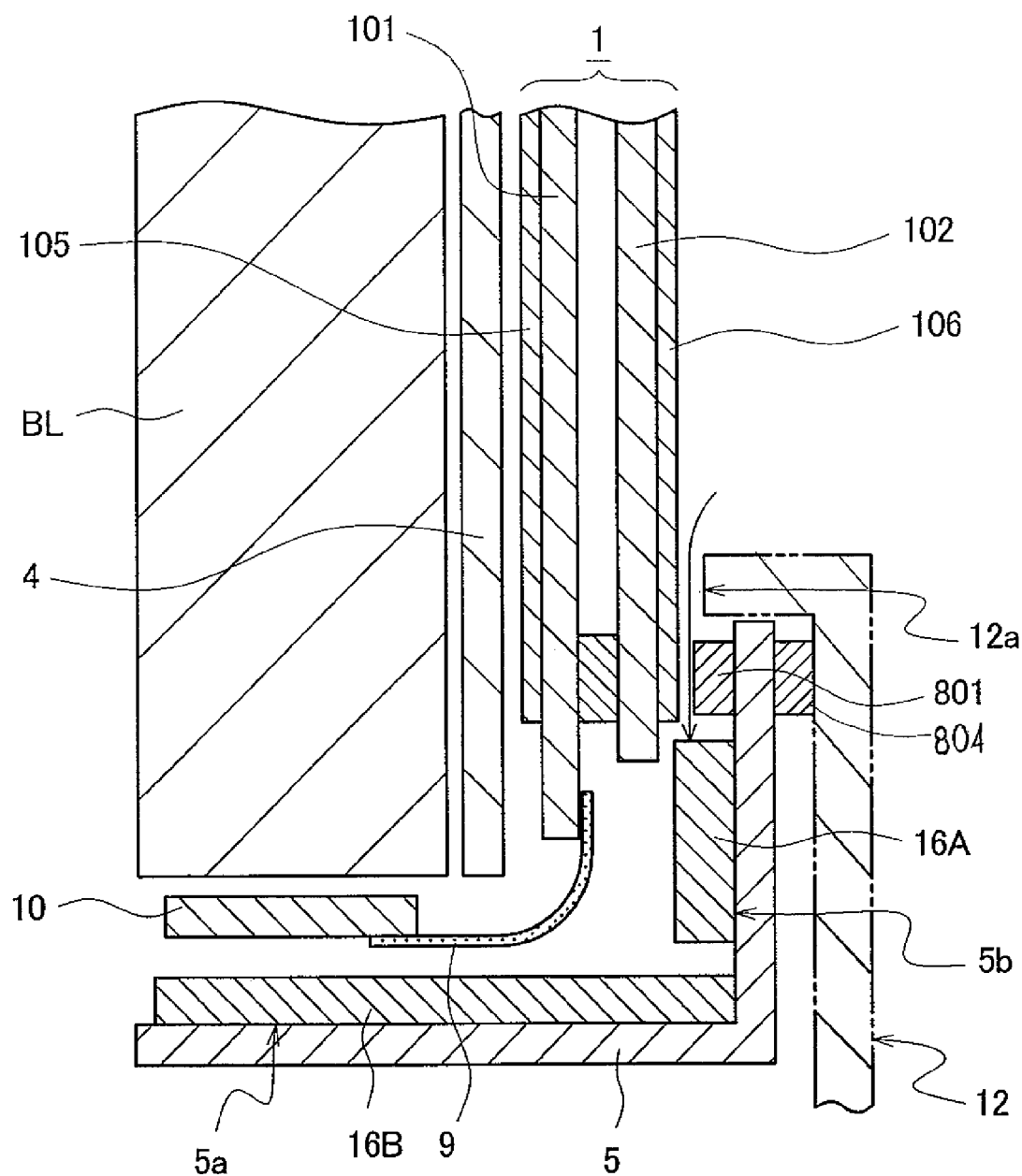
FIG. 11 is a schematic cross-sectional view showing a second modification of the liquid crystal display device of the embodiment 2.

FIG. 10 is a schematic cross-sectional view showing a first modification of the liquid crystal display device of the embodiment 2. FIG. 11 is a schematic cross-sectional view showing a second modification of the liquid crystal display device of the embodiment 2.

In an example shown in FIG. 9, the water absorbing member 16 is adhered to a surface 5b to which the cushion material 801 of the upper frame 5 is adhered. However, the present invention is not limited to such a case and, as shown in FIG. 10, the water absorbing member 16 may be adhered to the bottom surface 5a of the upper frame 5. Further, as shown in FIG. 11, the water absorbing members 16A, 16B may be adhered to two surfaces including a surface 5b to which the cushion material 801 of the upper frame 5 is adhered and the bottom surface 5a of the upper frame 5. Here, as the water absorbing members 16A, 16B, one member having an L-shaped cross section may be adhered to a corner portion of the upper frame 5. Further, the water absorbing member 16A which is adhered to the surface 5b to which the cushion material 801 of the upper frame 5 is adhered and the water absorbing member 16B which is adhered to the bottom surface 5a may be made of the same material or may be materials having different absorbance (absorbing ratio).

Figure 12:
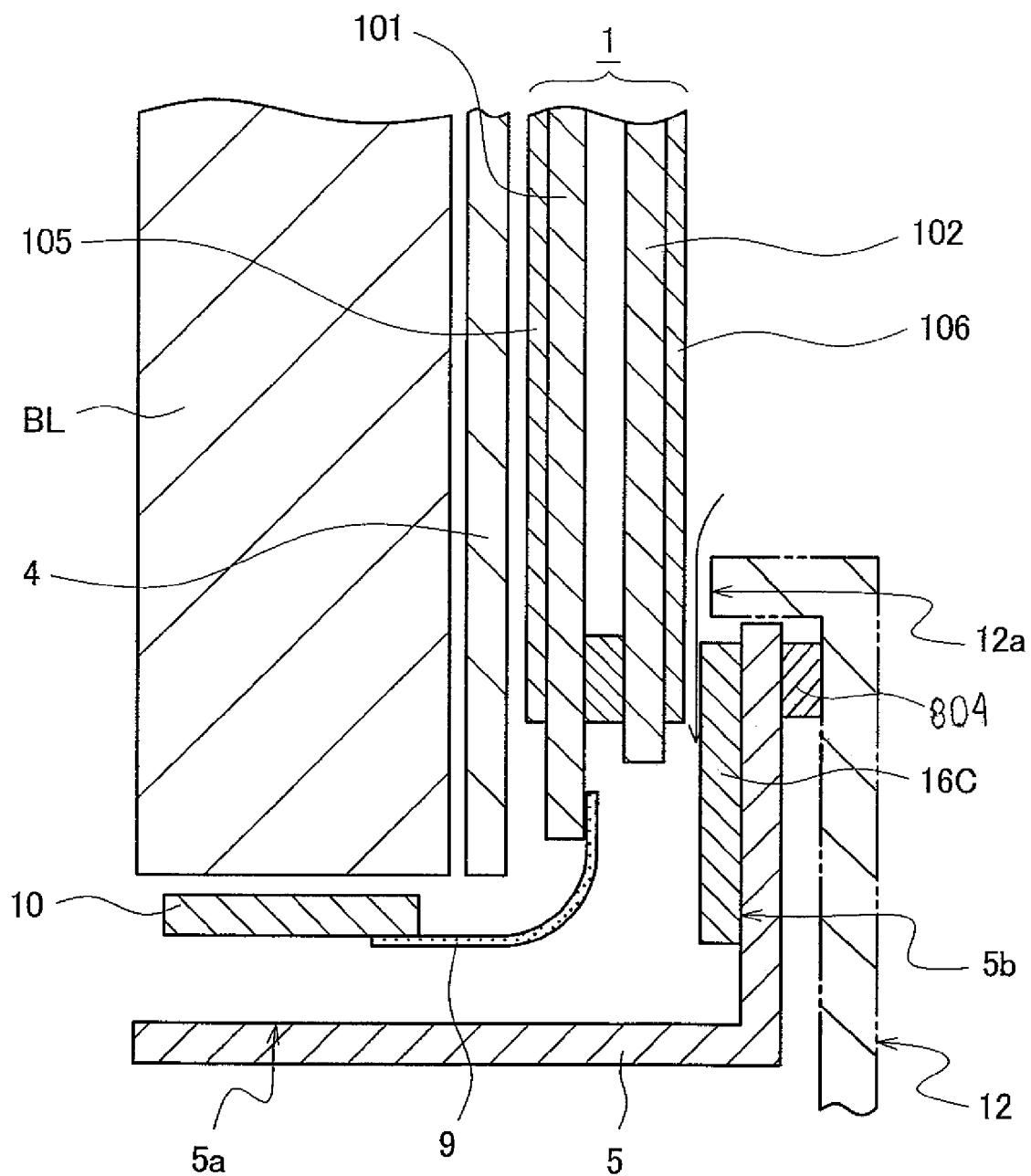
FIG. 12 is a schematic cross-sectional view showing a third modification of the liquid crystal display device of the embodiment 2.

FIG. 12 is a schematic cross-sectional view showing a third modification of the liquid crystal display device of the embodiment 2.

In the example shown in FIG. 9, the water absorbing member 16 is adhered to the surface to which the cushion material 801 of the upper frame 5 is adhered. However, the present invention is not limited to such a case and, for example, a member 16C made of a material having a cushioning property (impact resistance) and a high absorbance may be adhered to the upper frame 5.

Figure 13:
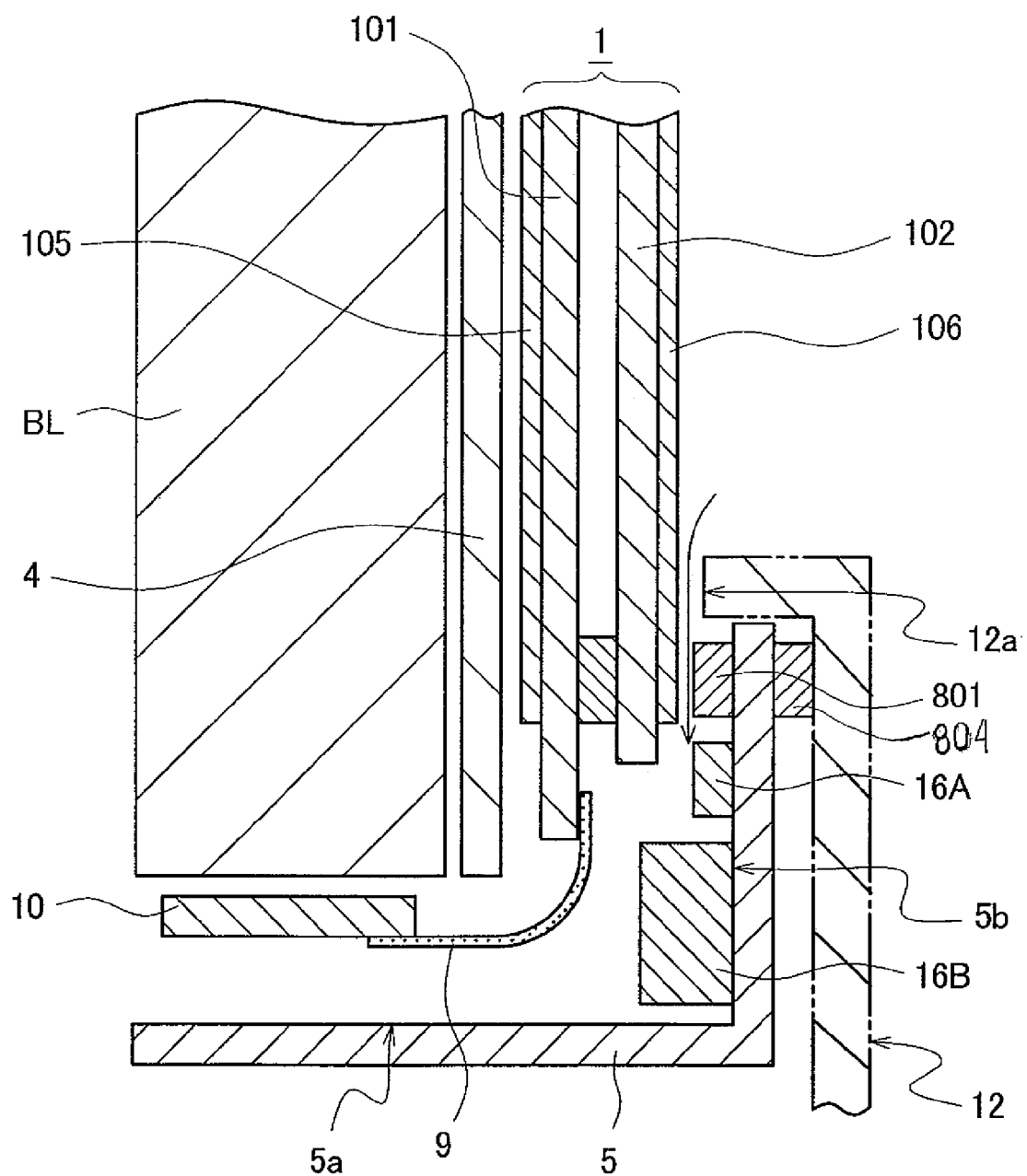
FIG. 13 is a schematic cross-sectional view showing a fourth modification of the liquid crystal display device of the embodiment 2.

FIG. 13 is a schematic cross-sectional view showing a fourth modification of the liquid crystal display device of the embodiment 2.

In the example shown in FIG. 9, one kind of water absorbing member 16 is adhered to the surface 5b to which the cushion material 801 of the upper frame 5 is adhered. However, the present invention is not limited to such a case and, as shown in FIG. 13, two water absorbing members 16A, 16B having different thicknesses are adhered to the surface 5b to which the cushion material 801 of the upper frame 5 is adhered. Here, the two water absorbing members 16A, 16B are constituted in a state that a thickness of the water absorbing member which is closer to a moisture intrusion opening is set small, while a thickness of the water absorbing member which is far from the moisture intrusion opening is set large, for example. Further, the two water absorbing members 16A, 16B may be made of materials having different absorbance (absorbing ratio), for example. Further, in place of adhering the two water absorbing members 16A, 16B, one water absorbing member having a stepped portion may be adhered to the surface 5b to which the cushion material 801 of the upper frame 5 is adhered.

Here, in the embodiment 2, the case in which the water absorbing member 16 is adhered to a surface on the lower side of the liquid crystal display panel 1 out of surfaces in the inside of the upper frame 5 is exemplified. However, the present invention is not limited to such a case, and the water absorbing member 16 may be adhered to a surface on the upper side of the liquid crystal display panel 1 or may be adhered to left or right sides of the liquid crystal display panel 1. Further, in the embodiment 2, the case in which the flexible printed circuit board 9 and the printed circuit board 10 for inputting the video signal lines are connected to the lower side of the liquid crystal display panel 1 is exemplified. However, the present invention is not limited to such a case, and the flexible printed circuit board 9 and the printed circuit board 10 may be connected to the upper side of the liquid crystal display panel 1. The flexible printed circuit board 9 and the printed circuit board 10 may be connected to both of the upper side and the lower side of the liquid crystal display panel 1.

Further, in the embodiment 2, the transmissive liquid crystal display device is exemplified. However, the present invention is not limited to the transmissive liquid crystal display device and, it is needless to say that the liquid crystal display device may be a semi-transmissive liquid crystal display device or a reflective liquid crystal display device. Further, when the liquid crystal display device is the transmissive liquid crystal display device or the semi-transmissive liquid crystal display device, the constitution of the backlight BL is not limited to a combination of the fluorescent tube 2 and the reflector 3 and, for example, the backlight BL may be constituted of a combination of the fluorescent tube 2 and the light guide plate or a combination which uses the spot light sources such as the LEDs in place of the fluorescent tube 2.

Further, in the embodiment 2, the liquid crystal display device is exemplified. However, the present invention is not limited to the liquid crystal display device, and it is needless to say that, for example, the display device may be a display device which uses PDP or a display device which uses an organic EL panel.

Embodiment 3

Figure 14:
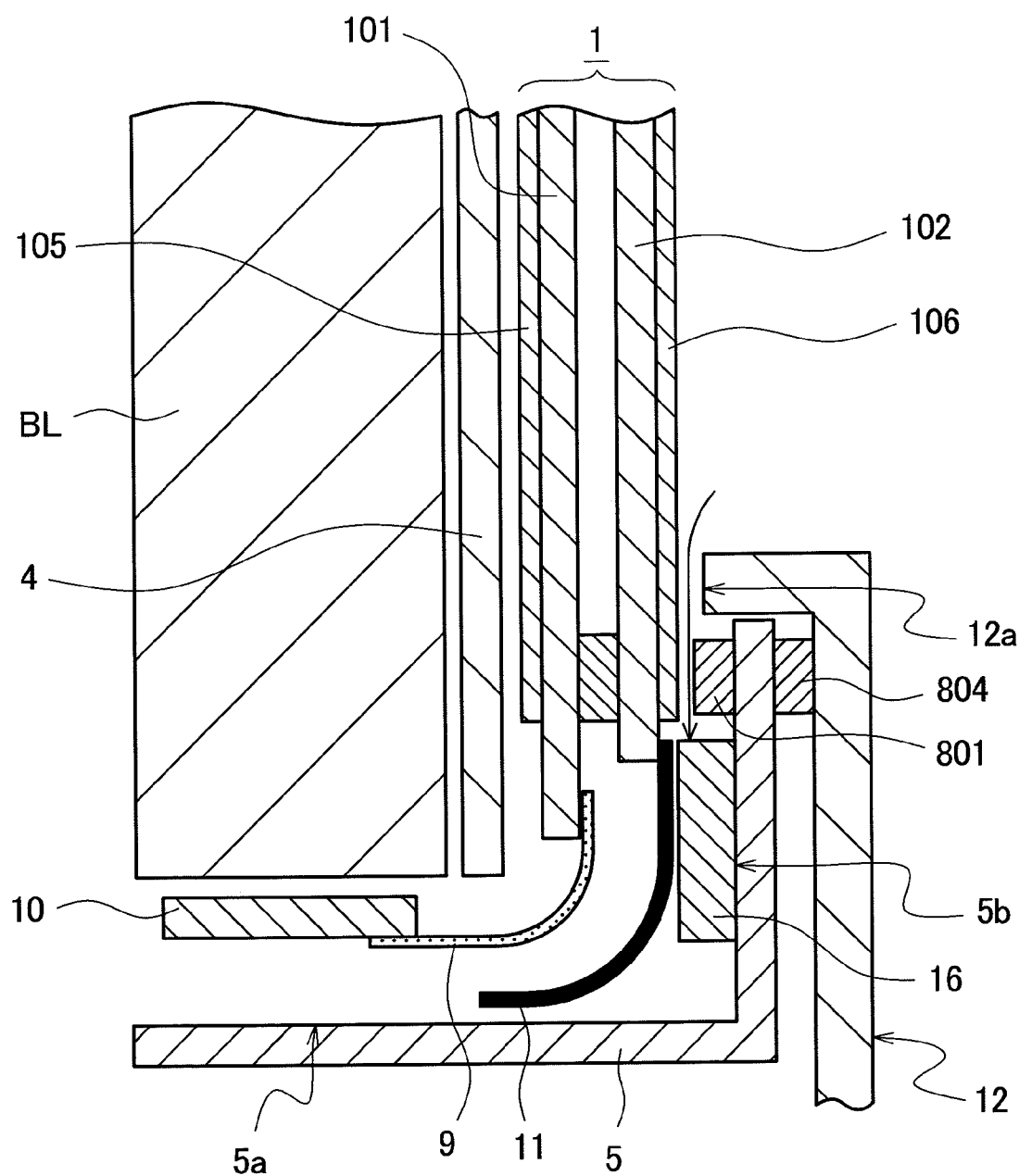
FIG. 14 is a schematic cross-sectional view showing the schematic constitution of a liquid crystal display module which is housed in a liquid crystal display device of an embodiment 3.
Figure 15:
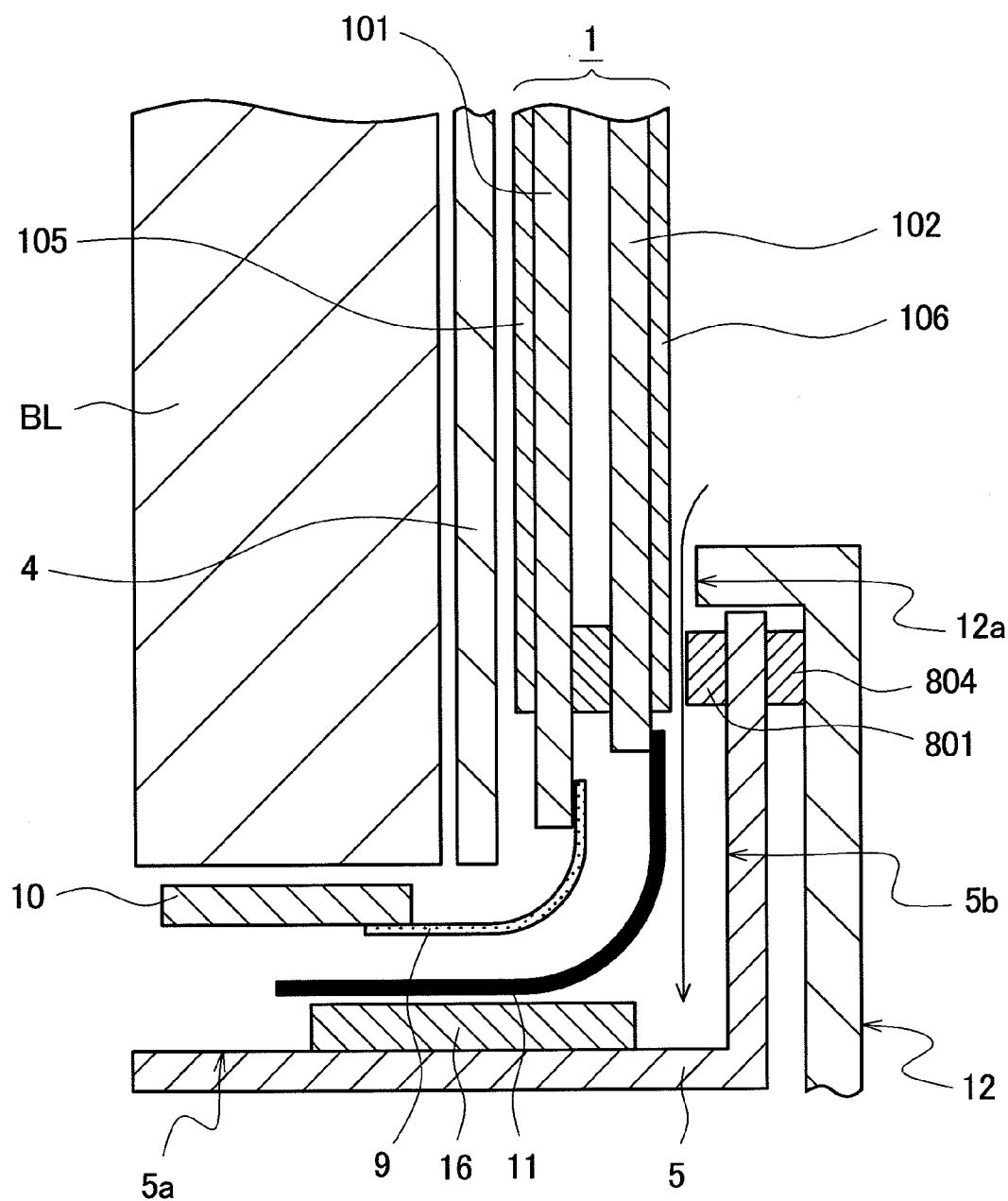
FIG. 15 is a schematic cross-sectional view showing a modification of the liquid crystal display device of the embodiment 3.
Figure 16:
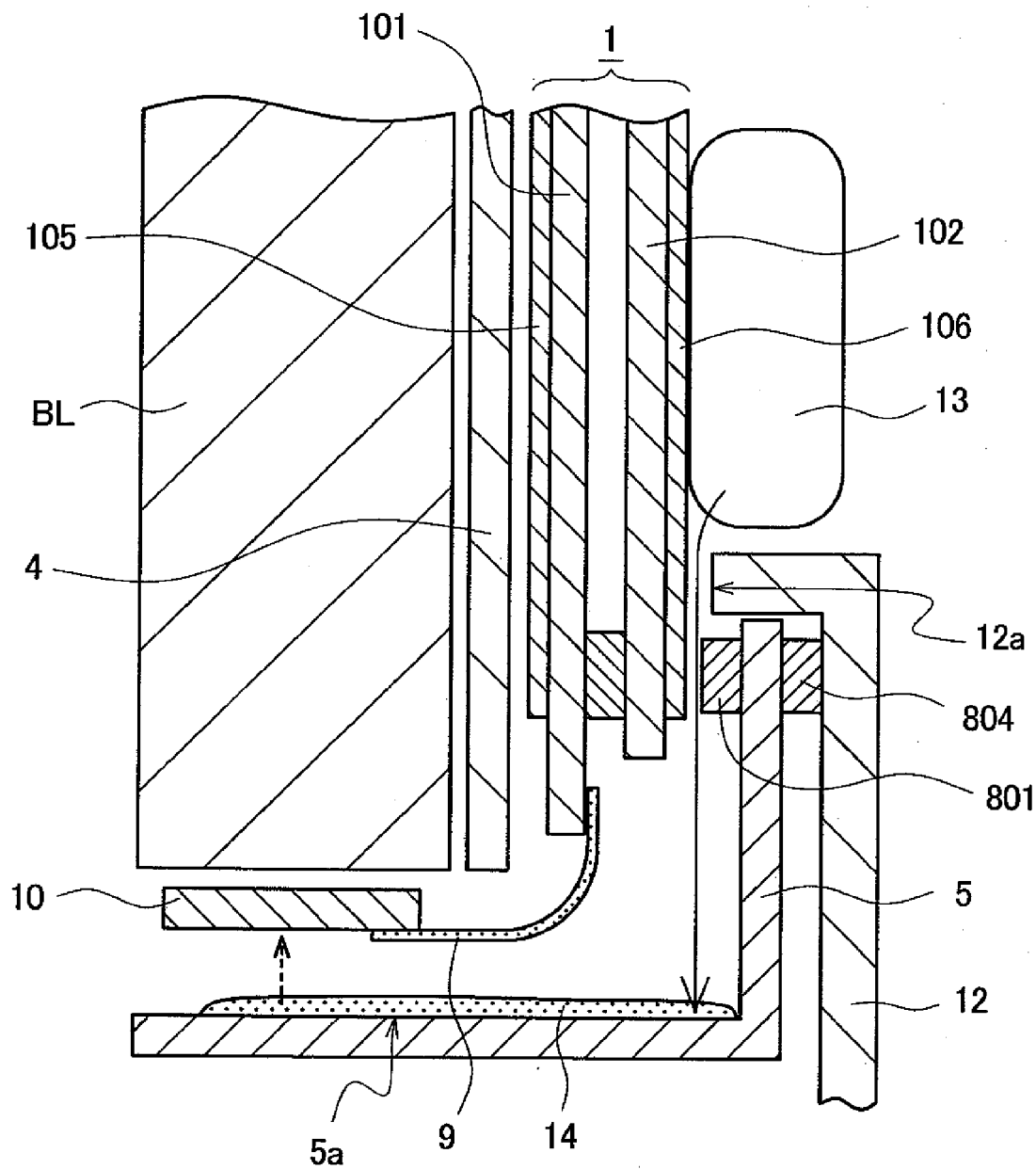
FIG. 16 is a schematic cross-sectional view for explaining drawbacks of a conventional liquid crystal display device.

FIG. 14 and FIG. 15 are schematic views showing the schematic constitution of a liquid crystal display device of an embodiment 3 according to the present invention. FIG. 14 is a schematic cross-sectional view showing the schematic constitution of a liquid crystal display module housed in the liquid crystal display device of the embodiment 3. FIG. 15 is a schematic cross-sectional view showing a modification of the liquid crystal display device of the embodiment 3. Here, FIG. 14 and FIG. 15 correspond to the cross-sectional view taken along a line B-B' in FIG. 8 and are schematic cross-sectional views which omit the constitution which are not directly relevant to the present invention.

The liquid crystal display device of the embodiment 3 is a display device which is acquired by combining the embodiment 1 and the embodiment 2. That is, the embodiment 3 provides the liquid crystal display device which can further enhance the advantageous effect to prevent the corrosion of the flexible printed circuit board 9 and the printed circuit board 10 by using the waterproof sheet 11 and the water absorbing member 16.

The liquid crystal display device of the embodiment 3 is a transmissive liquid crystal display device. As shown in FIG. 14, for example, a backlight BL is arranged behind a liquid crystal display panel 1, and an optical sheet 4 is arranged between the liquid crystal display panel 1 and the backlight BL. The liquid crystal display panel 1 is a display panel which sandwiches a liquid crystal material 103 between a TFT substrate 101 and a counter substrate 102. Further, in the liquid crystal display device 1, for example, a lower polarizer 105 is arranged on a back surface of the TFT substrate 101 and an upper polarizer 106 is arranged on a back surface of the counter substrate 102. Here, retardation plates may be arranged between the TFT substrate 101 and the lower polarizer 105 as well as between the counter substrate 102 and the upper polarizer 106.

Further, the backlight BL may be, as mentioned in the embodiment 1, constituted of a combination of a fluorescent tube 2 and a reflector 3 or a combination of the fluorescent tube 2 and a light guide plate. Still further, the backlight BL may be constituted of a combination which uses spot light sources such as LEDs in place of the fluorescent tube 2.

Further, in the liquid crystal display panel 1, for example, a plurality of video signal lines (not shown in the drawing) which extends in the longitudinal direction of a display region DA is arranged in the lateral direction of the display region DA, while a plurality of scanning signal lines (not shown in the drawing) which extends in the lateral direction of the display region DA is arranged in the longitudinal direction of the display region DA. Here, a region surrounded by two adjacent video signal lines and two adjacent scanning signal lines forms one pixel region. Here, the each brightness (gray scales) of the respective pixel regions are controlled in response to video signals which are inputted to the video signal lines and scanning signals which are inputted to the scanning signal lines. For this end, for example, a flexible printed circuit board 9 for inputting video signals to the video signal lines has one end thereof connected to the lower side of the TFT substrate 101 of the liquid crystal display panel 1. Further, the flexible printed circuit board 9 has the other end thereof connected to a printed circuit board 10. Here, although not shown in FIG. 14, a driver IC (a drain driver), for example, may be mounted on the flexible printed circuit board 9.

Although not shown in the drawing, a flexible printed circuit board and a printed circuit board for inputting the scanning signal lines are connected to left and right sides of the TFT substrate 101 of the liquid crystal display panel 1 besides the flexible printed circuit board 9 and the printed circuit board 10 for inputting the video signals. Also, a driver IC (a gate driver), for example, may be mounted on the flexible printed circuit board for inputting the scanning signal lines.

Also in the liquid crystal display device of the embodiment 3, the liquid crystal display panel 1, the backlight BL, and the optical sheet 4 are integrally supported on a frame member which is constituted of an upper frame 5, a lower frame (not shown in the drawing) and an intermediate frame (not shown in the drawing), for example.

Further, in the liquid crystal display device of the embodiment 3, for example, a waterproof sheet 11 is adhered to a lower side of the counter substrate 102 of the liquid crystal display panel 1. The waterproof sheet 11 is arranged to extend along an inner surface of the upper frame 5. Further, a water absorbing member 16 is arranged between the upper frame 5 and the waterproof sheet 11. The water absorbing member 16 is made of a tacky material or an adhesive material having high waterproof and is adhered to a surface of the upper frame S to which a cushion material 801 is adhered. The upper surface 5*b* of the upper frame 5 forms a front bezel of the upper frame 5, while the bottom surface 5*a* of the upper frame 5 forms a side bezel of the upper frame 5.

Due to such a constitution, for example, in cleaning the display screen, when a cloth 13 or the like containing water wipes the screen and moisture contained in the cloth infiltrates the inside of the display module through a gap defined between an upper polarizer 106 (liquid crystal display panel 1) and an end portion 12*a* of a housing and a gap defined between the upper polarizer 106 and the cushion material 801 (upper frame 5), the infiltrated moisture is absorbed by the water absorbing member 16. Further, even when the infiltrated moisture cannot be absorbed by the water absorbing member 16, the waterproof sheet 11 constitutes a wall and prevents the unabsorbed moisture from being adhered to the flexible printed circuit board 9 or the printed circuit board 10. Accordingly, it is possible to further enhance the advantageous effect to prevent the corrosion of the flexible printed circuit board 9, the printed circuit board 10 or the driver IC attributed to the moisture which infiltrates the inside of the display module though the gap defined between the upper polarizer 106 (liquid crystal display panel 1) and the cushion material 801 (upper frame 5).

Further, the water absorbing member 16 may be, for example, as shown in FIG. 15, adhered to a bottom surface 5*a* of the upper frame 5.

Further, although not shown in the drawing, it is needless to say that the various adhering methods which are explained in the embodiment 2 may be applicable to the water absorbing member 16.

Further, in the embodiment 3, the transmissive liquid crystal display device is exemplified. However, the present invention is not limited to the transmissive liquid crystal display device and, it is needless to say that the liquid crystal display device may be a semi-transmissive liquid crystal display device or a reflective liquid crystal display device. Further, when the liquid crystal display device is the transmissive liquid crystal display device or the semi-transmissive liquid crystal display device, the constitution of the backlight BL is not limited to a combination of the fluorescent tube 2 and the reflector 3. For example, the backlight BL may be constituted of a combination of the fluorescent tube 2 and the light guide plate or a combination which uses the spot light sources such as the LEDs in place of the fluorescent tube 2.

Further, in the embodiment 3, the liquid crystal display device is exemplified. However, the present invention is not limited to the liquid crystal display device, and it is needless to say that, for example, the display device may be a display device which uses PDP or a display device which uses an organic EL panel.

Although the present invention has been specifically explained in conjunction with the embodiments, it is needless to say that the invention is not limited to the embodiments and various modifications are conceivable without departing from the gist of the invention.

What is claimed is:

1. A display device comprising:
    a display panel including a substantially polygonally shaped display screen for displaying an image to look at and further including an upper side and a lower side relative to the display screen in a state when an image is being displayed on the display screen; and
    a frame member including a front bezel which covers an outer peripheral portion of the display screen of the display panel and a side bezel of the frame member which covers a side portion of the display panel, wherein a gap is provided between the front bezel of the frame member and the display panel;
    wherein a waterproof sheet is interposed between the display panel and the front bezel of the frame member
    wherein a water absorbing member is arranged between the waterproof sheet and the front bezel of the frame member; and
    wherein the waterproof sheet is adhered to the lower side of the display panel.

2. The display device according to claim 1, wherein the water absorbing member is adhered to the front bezel of the frame member.

3. The display device according to claim 1, wherein the display panel comprises a liquid crystal display panel.

* * * * *